2,876,209

ORGANIC SILICON COMPOUNDS AND METHODS FOR MAKING THEM

Peter L. de Benneville, Philadelphia, and Marvin J. Hurwitz, Elkins Park, Pa., assignors to Rohm & Haas Company, Philadelphia, Pa., a corporation of Delaware No Drawing. Application June 1, 1955
Serial No. 512,572

17 Claims. (Cl. 260—45.4)

This invention concerns the production of organic silicon-containing compounds, novel methods of producing them, and it includes various new classes of such compounds.

In accordance with the present invention, the starting compounds for carrying out the reactions are aminosilanes or hydrocarbon-substituted diaminopolysiloxanes which generally have the structure of Formulas I and Ia:

I  $\quad (R°)_{4-x}Si(-NR'R'')_x$

Ia

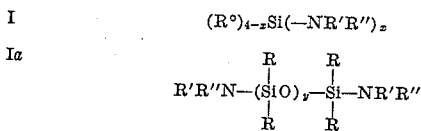

where R° is a cyclohexyl group, and aryl group, especially phenyl, an alkenyl group, especially vinyl, allyl or cyclohexenyl, or an alkyl group having 1 to 18 carbon atoms, and especially an alkyl of 1 to 4 carbon atoms (groups R° may be the same or different when I contains a plurality thereof), R is a lower alkyl group having 1 to 3 carbon atoms, methyl being preferred (the R groups attached to a given silicon atom may be the same or different), R' and R'' together may be the morpholino residue $=(CH_2CH_2)_2O$, the piperidino residue $-(CH_2)_5-$, or the pyrrolidino residue $-(CH_2)_4-$, or separately R' may be cyclohexyl, phenyl, aralkyl, especially benzyl, or an alkyl group having 1 to 18 carbon atoms, R'' may be hydrogen, cyclohexyl, aralkyl, especially benzyl, or an alkyl group having 1 to 18 carbon atoms, the total of carbon atoms in R' and R'' together being no greater than 18, with the proviso that when R'' is an alkyl group containing a tertiary carbon atom attached to the nitrogen atom, then R'' must be H, $x$ is an integer having a value of 1 to 4, and $y$ is an integral or mixed number having a value or an average value of about 1 to 9.

Throughout the specification and claims, the symbols above are used with the same meaning as defined above.

The compounds within the scope of Formula I are in many cases known and are generally liquids at normal temperatures. Generally the entire group can be made by reacting at low temperatures of 0° to 50° C., preferably 0° to 5° C., the corresponding mono-, di-, tri-, or tetra-chlorosilane or hydrocarbon-substituted chlorosilane with an appropriate amine of the formula NHR'R'' under anhydrous conditions, optionally in the presence of an inert organic solvent, such as benzene. Excess amine or additional tertiary amine, such as triethylamine, is provided to accept the hydrogen chloride liberated in the reaction and form the corresponding amine salt which may be removed by filtration. The filtrate is stripped of solvent, if any, and the product of Formula I is distilled.

The compounds of Formula Ia are new and form the subject matter of our copending U. S. application Serial No. 512,573, filed on even date herewith. These new compounds, which are generally liquids at normal temperatures, may be made by reacting an amine NHR'R'' with dichloropolysiloxanes of the Formula Ib:

Ib  $\quad Cl(Si(R)_2O)_y-Si(R)_2Cl$

The compounds of Formula Ib and their method of production are generally disclosed in U. S. Patent 2,381,366. To form compounds of Formula Ia, those of Ib are reacted with two molar equivalents of an amine NHR'R'' or of a mixture of two or more such amines. In the reaction vessel there may be present an excess of the amine over the two molar equivalents to serve as an acceptor for the hydrogen chloride produced. Alternatively, a tertiary amine such as trimethylamine, triethylamine, pyridine or quinoline may be used as such acceptor. The reaction may be effected at a temperature of about $-20°$ C. to room temperature, preferably between $-5°$ C. and $+10°$ C. The reaction is preferably carried out in an anhydrous solvent, such as benzene, toluene or xylene, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient excess of amine or sufficient tertiary amine should be added to take up all of the hydrogen chloride liberated and preferably an excess over this amount is used.

According to the present invention, it has been found that compounds of Formulas I and Ia react rapidly with many organic compounds containing reactive hydrogen, namely alcohols, mercaptans, phenols, amines, amides, ureas, lactams, and carbamates (or urethanes). The reaction is apparently an equilibrium reaction involving the interchange of the amino group or groups $-NR'R''$ and the residue Z (all but the reactive hydrogen atom) of the reactive-hydrogen-containing compound according to the following equation illustrating the reaction between a monoaminosilane of Formula I with a monofunctional compound ZH containing a reactive hydrogen:

$$(R°)_3SiNR'R'' + ZH \rightleftarrows (R°)_3SiZ + NHR'R''$$

To shift the equilibrium to the right, it is merely necessary that the amine NHR'R'' be removed. This can be done simply by volatilization thereof provided the amine NHR'R'' corresponding to the group $-NR'R''$ in the silyl amine has a substantially lower boiling point than the compound ZH. The reaction may be performed either with or without an inert organic solvent, such as benzene, toluene, xylenes, solvent naphthas, but in any event anhydrous conditions should be maintained. The temperatures may range from 10° C. up to 180° C. or so, generally being effected at, or approximately at the boiling point of the amine to be liberated. One reactant may be added to the other gradually to facilitate proper control of the temperature, but this is not always necessary, depending on the particular reactants ZH and of Formulas I and Ia.

Because of the simplicity of removing the displaced amine by volatilization, this process is highly advantageous not only for producing new types and classes of compounds described hereinafter but also to produce known compounds, such as alkoxysilanes or dialkoxypolysiloxanes which had previously been produced by reaction of alcohols with corresponding chlorosilanes or dichloropolysiloxanes.

The advantage of the process of the present invention lies in the fact that by merely warming or heating the two reactants (ZH and a compound of one of Formulas I and Ia), an amine is released and the condensation is effected.

Since no acidic material, such as HCl, is released (as in the previous methods using chlorosilanes or the like), there is no acid-catalyzed degradation of the products, and there is no material present other than the condensation product (such as an amine hydrochloride where an amine is used as an HCl acceptor). The yields are higher in the new process than when chlorosilanes are used.

Generally the most useful starting compounds of Formulas I and Ia are those in which the amino group or groups —NR'R" correspond to the lower primary or secondary alkyl amines such as methylamine, dimethylamine, ethylamine, diethylamine, propylamine, dipropylamine, isopropylamine, or t-butylamine. These amines have boiling points of about 56° C. or below. However, when the reactive-hydrogen-containing compound ZH is one which requires a higher reaction temperature, the Compounds I and Ia may contain groups —NR'R" corresponding to amines NHR'R" of higher boiling point provided it is substantially lower than the boiling point of the compound ZH. The higher boiling primary and secondary amines may be used, such as t-amylamine, hexylamine, cyclohexylamine, t-octylamine, decylamine, octadecylamine, morpholine, piperidine, pyrrolidine, aniline, and benzylamine.

The following description of the reaction and of the products obtained is broken down to the type of reactive-hydrogen-containing compounds ZH which are reacted with a compound of one of Formulas I and Ia.

ALCOHOLS

Alkoxysilanes and hydrocarbon-substituted dialkoxy-polysiloxanes are obtained when compounds of Formula I or Ia are reacted with alcohols $R^2OH$. They may be represented by the general Formulas II and IIa:

II        $(R^°)_{4-x}Si(OR^2)_x$
IIa       $R^2O(Si(R)_2O)_ySi(R)_2OR^2$ where $R^2$ is an alkyl or alkenyl group of 1 to 18 carbon atoms derivable from monohydric alcohols, such as methyl, ethyl, propyl, isopropy, butyl, amyl, hexyl, cyclohexyl, octyl, t-octyl, dodecyl, dodecenyl, hexadecyl, or octadecyl alcohol.

The products are generally liquids which are useful as hydraulic transmission media and lubricants. The compounds of Formula IIa are especially useful lubricants for high-pressure systems.

MERCAPTANS OR THIOLS

Valuable products of the Formulas III and IIIa:

III       $(R^°)_{4-x}Si(SR^3)_x$
IIIa      $R^3S(Si(R)_2O)_ySi(R)_2SR^3$ where the group $R^3S$— is derived from monothiols, such as methyl, ethyl, propyl, isopropyl, butyl, amyl, hexyl, cyclohexyl, octyl, t-octyl, dodecyl dodecenyl hexadecyl, or octadecyl mercaptan, are obtained when compounds of Formula I and Ia are reacted with mercaptans of the formula $R^3SH$. Branched chain mercaptans, such as the t-dodecyl mercaptan derived from propylene polymers and hydrogen sulfide, are particularly valuable reactants. $R^3$ is an alkyl or alkenyl group, especially those having from 1 to 18 carbon atoms.

The products are generally liquids which are useful as lubricants and hydraulic transmission media in high-pressure systems, and especially where high temperatures are also involved.

PHENOLS AND THIOPHENOLS

Valuable new compounds are obtained by the reaction of phenols or thiophenols with a compound of one of Formulas I and Ia. These compounds generally have the structure of Formulas IV and IVa:

IV       $(R^°)_{4-x}Si(A\phi)_x$
IVa      $\phi A(Si(R)_2O)_ySi(R)_2A\phi$ where A is O or S, and $\phi$ is an aryl or substituted aryl group, such as phenyl, tolyl, xylyl, isopropylphenyl, t-butylphenyl, t-octylphenyl, halophenyl, e. g. mono-, di-, or trichloro- or -bromo-phenyl, nitrophenyl, formylphenyl, alkanoylphenyl, acetophenyl, (dimethylaminomethyl)-phenyl, bis-(dimethylaminomethyl)phenyl, tris-(dimethylaminomethyl)phenyl, and p-t-butyl-o-(dimethylaminomethyl)phenyl.

The products of Formulas IV and IVa are generally liquids except for those of higher molecular weight which are solids at normal temperatures. The liquids are useful as synthetic lubricants, and also as power transmission media in hydraulically-operated mechanisms, such as brakes and lifts. They are also useful to suppress foam in steam-generating systems.

AMINES

The compounds of Formulas I and Ia, having amino groups (—NR'R" corresponding to amines NHR'R" in which the substituents R' and R" are such that the amines are relatively low-boiling) can be reacted with higher boiling amines to replace the groups —NR'R" with other amino groups within the broad scope of the definition of —NR'R" hereinabove. This provides an additional way of producing many other compounds of the structure of Formulas I and Ia from any particular compound, such as N-methylaminotrimethylsilane, di-(N-ethylamino)diethylsilane, tri-(N-isopropylamino)methylsilane, or a bis-(N-dimethylamino)polydimethylsiloxane having from 1 to 9 siloxane units. Any of these compounds may be reacted with such amines as hexylamine, morpholine, aniline, piperidine, pyrrolidine, t-octylamine, or octadecylamine to replace the lower substituted amino groups with the substituted amino group of the latter compounds. Certain of the amines thereby obtained are claimed in the aforementioned application Serial No. 512,573.

AMIDES AND LACTAMS

By reacting the compounds of Formulas I and Ia with amides or lactams, a whole new class of valuable organic silicon-containing compounds are readily obtained in good yields.

An important group of these new compounds which are obtained from the amides are those having the structure of Formulas V and Va following:

V

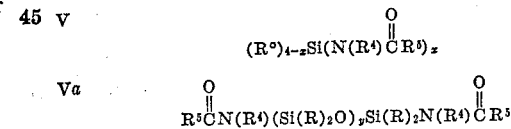

Va

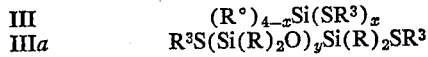

where $R^4$ is H, alkyl, or alkenyl, especially those having 1 to 18 carbon atoms, such as methyl, ethyl, butyl, hexyl, dodecenyl, octyl, octadecyl, etc., and $R^5$ is H cyclohexyl, aryl, such as phenyl, alkenyl, or alkyl, especially these types of groups having from 1 to 18 carbon atoms, such as methyl, ethyl, isopropyl, butyl, hexyl, octyl, octadecyl, etc.

Examples of amides that may be reacted to form compounds of Formulas V and Va include formamide, N-methyl formamide, N-octadecyl formamide, acetamide, N-methyl acetamide, N-ethyl acetamide, N-dodecyl acetamide, propionamide, N-alkyl propionamides, e. g. N-methyl propionamide, butyramide and N-alkyl butyramides; lauramide, and N-alkyl lauramides; stearamide, and N-alkyl stearamides, such as N-methyl stearamide and N-ethyl stearamide, benzamide, N-substituted benzamides, e. g., N-methylbenzamide, methacrylamide, N-methylmethacrylamide, acrylamide, and N-ethylacrylamide.

Another group obtained from the lactams include compounds having the structure of Formulas VI and VIa:

VI

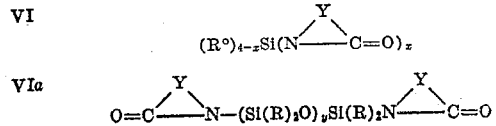

VIa

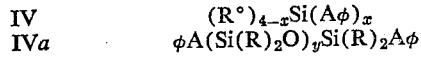

where Y is an alkylene group having 3 to 18 carbon atoms, with a chain of at least 3 but no more than 5 carbon atoms extending between the N atom and carbonyl group.

Examples of lactams that may be used include γ-butyrolactam, (2-pyrrolidone), delta-valerolactam, epsilon-caprolactam, 3-methyl-2-pyrrolidone, trimethyl-2-pyrrolidone, and 5-methyl-2-pyrrolidone.

The amides and lactams of Formulas V, Va, VI, and VIa are generally (1) solids, some of which may be distilled, or (2) high-boiling liquids. Thus, when $x$ is 1 in Formulas V and VI, the products are generally distillable solids or liquids. When $x$ is 2 to 4, the products are solids to all intents and purposes at room temperatures. The compounds of Formulas IVa and Va may be liquids of oily character or waxy solids depending on the particular substituents R, Y, $R^4$, $R^5$ and the size of $y$.

The silylamides or silyllactams of Formulas V and VI when R° is methyl, frequently have physiological effects and act as hypnotics and anticonvulsants. They also serve as pesticides, and especially as insecticides and miticides. The compounds of Formulas V, Va, VI, and VIa may be applied to leather, fabrics of cotton, rayon, polyethylene terephthalate, nylon, zein, casein, or the like, or to non-fibrous sheets of cellophane of polyethylene terephthalate to modify the water-absorption, shrinkage, and dyeing properties of the leather, fabrics or non-fibrous sheets. Those derived from unsaturated compounds, such as acrylamide, methacrylamide, and the like are also polymerizable by simple addition in the presence of free radical initiators or catalysts, such as benzoyl peroxide, azodiisobutyronitrile, azodiisobutyramide or the diesters such as azodiisobutyrate. Such addition polymerization produces fusible products which may be applied to leather, paper pulp, fabrics of the type named, or the non-fibrous films or sheets named above, and then converted to infusible condition by heating to 230° to 300° F. for several minutes to a half hour.

UREAS

Another valuable group of new compounds is obtained by reacting a urea with a compound of Formula I or Ia. A preferred group of these new products are those having the structure of Formulas VII and VIIa:

VII

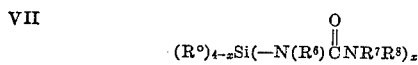

VIIa

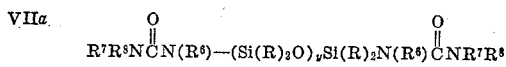

where $R^6$ is hydrogen, benzyl, or an alkyl or alkenyl group of 1 to 18 carbon atoms, $R^7$ is H or phenyl, or alkyl of 1 to 4 carbon atoms, and $R^8$ is H, phenyl, benzyl, or alkyl of 1 to 4 carbon atoms.

These compounds are obtained when urea or substituted ureas of non-cyclic character are used as the starting materials, such as urea, N-methylurea, N-ethylurea, N-phenylurea, N,N'-diethylurea, N,N'-dimethylurea, or N,N,N'-trimethylurea.

Another group has the structure of Formulas VIII and VIIIa:

VIII

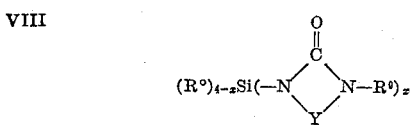

VIIIa

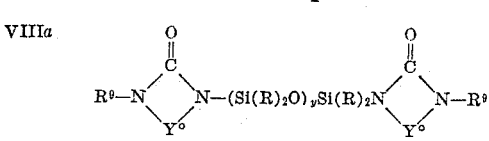

where $R^9$ is hydrogen, phenyl, benzyl, cyclohexyl, or an alkyl group having 1 to 8 carbon atoms, and Y° is an alkylene group of 2 to 18 carbon atoms, of which 2 to 3 thereof extend in a chain between the adjoined nitrogen atoms.

They are obtained by reacting compounds of Formulas I and Ia with cyclic ureas, which may also be called 2-imidazolidinones and hexahydropyrimidinones, such as N,N'-ethyleneurea, N,N'-trimethyleneurea, N-methyl-N,N'-ethyleneurea, and N-phenyl-N,N'-ethyleneurea.

In some cases, when two equivalents of the silylated amine are used in the reaction, as in the reaction of N,N'-ethyleneurea with (R°)₃SiNR'R'', there may also be obtained in addition to a relatively small proportion of a monosubstituted compound of Formula VIII, a relatively large proportion of di-substituted compounds of Formula VIIIb:

VIIIb

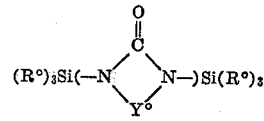

When the reaction is effected between N,N'-ethyleneurea and a compound of Formula I in which $x$ is greater than 1 or with a compound of Formula Ia, polymeric condensation products are obtained which are linear except when $x$ is 3 or 4, in which event they are of three-dimensional type.

The ureido-compounds of Formulas VII, VIIa, VIII, VIIIa, and VIIIb are generally solids. They may be applied to paper which, on heating to 230° to 300° F. for ½ to 5 minutes, as on calendaring cylinders, has its water-absorption characteristics greatly reduced and shows increased wet-strength. When one or more of groups $R^6$, $R^7$, and $R^8$ are relatively large so that their carbon atom total is 8 or more, the paper is water-repellent and acquires a waxy surface feel when 3% to 5% of the product is incorporated, based on the dry pulp weight of the paper. The compounds may also be applied to fabrics of cotton, rayon, zein, casein, or the like to reduce shrinkage, to crease-proof, to crush-proof, and to modify their moisture-absorption and dyeing characteristics. Application may also be made to non-fibrous sheets of cellophane, polyethylene terephthalate and to fabrics of nylon and Dacron (polyethylene terephthalate), for increasing water-repellency, reducing shrinkage, and/or modifying the feel of the surface, such as to provide a waxy, lubricous surface thereon. In all cases, the treated material should be heated to 230° to 300° F. or higher for several minutes to a half-hour to insolubilize the composition applied in situ on the fabric, sheet, or the like.

CARBAMATES

When a compound of Formula I or Ia is reacted with a carbamate containing a reactive hydrogen on the nitrogen atom, new derivatives are obtained having the structure of one of Formulas IX and IXa:

IX

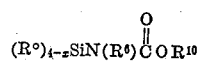

IXa

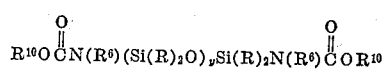

where $R^{10}$ is an aryl group, such as phenyl, tolyl, xylyl, an aralkyl group, such as benzyl, or an alkyl or alkenyl group having 1 to 18 carbon atoms.

The carbamates that may be so reacted include urethane, ethyl N-methylcarbamate, methyl N-benzylcarbamate, isopropyl carbamate, ethyl N-n-octylcarbamate, ethyl N-octadecylcarbamate, dodecenyl carbamate, phenyl carbamate, tolylcarbamate, and benzyl N-methylcarbamate.

These products include high-boiling liquids and solids. They are soluble in aromatic hydrocarbons, such as toluene, benzene, xylene. They may be applied to paper and heated to 230° to 300° F. for ½ to five minutes or more to reduce the water-absorptivity of the paper and increase the wet-strength thereof. When one or more of groups $R^6$ and $R^{10}$ are relatively large so that their carbon atom total is 8 or more, the paper is water-repellent and acquires a waxy surface feel when 3% to 5% of the product is incorporated, based on the dry pulp weight of the paper. The compounds may also be applied to fabrics of cotton, rayon, zein, casein, or the like to reduce shrinkage, to crease-proof, to crush-proof, and to modify their moisture-absorption and dyeing characteristics. Application may also be made to non-fibrous sheets of cellophane, polyethylene terephthalate and to fabrics of nylon and Dacron (polyethylene terephthalate), for increasing water-repellency, reducing shrinkage, and/or modifying the feel of the surface, such as to provide a waxy, lubricous surface thereon. In all cases, the treated material should be heated to 230° to 300° F. or higher for several minutes to a half-hour to insolubilize the composition applied in situ on the fabric, sheet, or the like.

ALTERNATE METHOD

The new compounds of all the foregoing types may also be obtained by reacting a reactive hydrogen-containing compound with a chlorosilane or an $\alpha,\omega$-dichloro-polysiloxane of one of Formulas I$d$ and I$b$ respectively:

I$d$      $(R°)_{4-x}SiCl_x$
I$b$      $Cl(Si(R)_2O)_y Si(R)_2 Cl$ where the symbols have the same definitions as before.

The reaction is effected in the presence of a tertiary amine, such as trimethylamine, triethylamine, pyridine or quinoline, as an acceptor for the hydrogen chloride developed by the reaction. The reaction may be effected at a temperature of about —20° C. to room temperature, preferably between —5° C. and +10° C. The reaction is preferably carried out in an anhydrous solvent, such as benzene, toluene or xylenes, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient excess of amine or sufficient tertiary amine should be added to take up all of the hydrogen chloride liberated and preferably an excess over this amount is used.

For reasons pointed out hereinabove, however, the use of an amino-silico-compound of one of Formulas I and I$a$ as the starting material for making these new compounds as well as those types which were known previously is distinctly advantageous. In some cases, especially in the making of the new compounds from ureas, the compounds of Formulas I$b$ and I$d$ either do not react or they produce a complex mixture containing by-products which is of such a character that isolation of the desired product is practically impossible. In no case, however, is the use of a chloro-silico-compound of Formulas I$b$ and I$d$ suitable for producing the new condensation products from the polyfunctional compounds hereinafter described.

POLYFUNCTIONAL COMPOUNDS

An extremely wide variety of new products are obtained by the reaction of compounds of Formulas I and I$a$ with compounds containing two or more reactive hydrogen-containing groups hereinafter referred to as functional groups, such as polyols, polythiols, polyamines, polyhydroxy-phenols, or -thiophenols, polyamides, polyureas, N,N'-ethyleneurea, and polycarbamates.

A. When a polyfunctional compound containing two or more reactive hydrogen-containing groups is reacted with a compound of Formula I in which $x$ is 1, the product is a silylated derivative of the polyfunctional compound. For example an alkyd having two terminal hydroxyl groups may be silylated at each end by this reaction. Again, cellulose may have a number of silyl groups introduced and it may thereby be rendered hydrophobic.

A polyamide, such as 66 nylon, may also be so modified and hydrophobized. Further examples of compounds that may be reacted with a compound of Formula I in which $x$ is 1 include sorbitol, mannitol, dulcitol, mannide, sorbide, mannitan mono-oleate, sorbitan monostearate, glycerol, glycerol monopalmitate, ethylene glycol, diethylene glycol, polyvinyl alcohol, partially saponified polyvinyl esters, such as polyvinyl acetate, secondary cellulose esters, e. g. of acetic acid or of mixed acids, such as of acetic and butyric, cellulose ethers as of methyl alcohol, ethyl alcohol, benzyl alcohol, also hydroxyethyl cellulose, carboxyethyl cellulose, starches, dextrines, ethylenediamine, diethylenetriamine, polyvinyl amines, polymers and copolymers of N-vinyloxyethyl-N,N'-ethyleneurea, biuret, linear condensation polymers of all types, including alkyds having terminal hydroxyl groups, terminal amino groups, or one terminal hydroxyl and a terminal amino group. These linear condensation polymers are mentioned in more complete detail hereinafter in connection with the reaction of compounds of Formula I$a$ and those of I in which $x$ is 2.

B. The reaction of any of the polyfunctional compounds just mentioned in paragraph A having more than two functional groups, such as glycerol, sorbitol, cellulose, polyamides, such as nylon 66, leather, etc. with a compound of Formula I in which $x$ is 2 or with a compound of Formula I$a$ results in a variety of compounds including cyclic compounds, complex three-dimensional resinous compounds or in cross-linking of molecules of the polyfunctional compound by silicon-containing bridges. This serves to modify the elastic properties as well as the susceptibility to fusion and/or dissolution by solvents of the initial polyfunctional compounds or materials.

Generally, in the reaction of a Formula I compound having $x$ equal to 2, when there are less than seven atoms in a chain extending between the nearest reactive hydrogen atoms, as in glycerol, a compound is produced comprising cyclic groups like

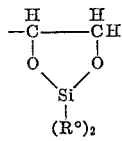

The other hydroxyl groups of the glycerol may be coupled with a hydroxyl of another glycerol molecule through an —Si(R°)$_2$— link, forming a complex polymeric molecule. Other glycerol molecules may react in such a way that their hydroxyls are linked through —Si(R°)$_2$— units without any cyclization, but this is relatively insignificant in proportion to the cyclization in glycerol where there are only four atoms between the adjacent reactive hydrogen atoms. However, when compounds having more than seven atoms between the reactive hydrogen atoms are reacted with a compound of Formula I in which $x$ is 2, the cycle-forming reaction is substantially entirely absent and the reaction linking different molecules is practically exclusive. Similarly, when a polymeric molecule containing numerous groups containing reactive hydrogen, such as regenerated cellulose or polyvinyl alcohol, is reacted with a compound of Formula I in which $x$ is 2, cycle formation may occur along with cross-linking, depending on the proximity of adjacent reactive hydrogen atoms, such as hydroxyls. When the compound that is reacted with a compound of Formula I in which $x$ is 2 has seven atoms between the reactive hydrogen atoms, there is generally both the reaction producing ring-formation and the reaction which links different molecules in linear fashion. The relative proportions of the cyclic and non-cyclic products depends on the particular reactants used.

C. When polyfunctional compounds containing more than two functional groups, such as those mentioned above in paragraph A are reacted with a compound of Formula I in which x is 3 or 4, even more highly complex cross-linking and/or cycle-formation is generally obtained with similar effects.

D. Cyclic silyl-carbinyl ethers are obtained as high-boiling, distillable oils by reacting a compound of Formula I in which x is 2 with diols or glycols having 2 to 5 atoms between the hydroxyl groups. The products have the general formula

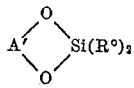

where A' is the residue of the diol or glycol. Examples of the glycols which react to form cyclic oils are ethylene glycol, diethylene glycol, dipropylene glycol (HOCH(CH$_3$)CH$_2$OCH$_2$CH(CH$_3$)OH), propylene glycol (HOCH(CH$_3$)CH$_2$OH)

pinacol (HOC(CH$_3$)$_2$C(CH$_3$)$_2$OH), 2,5-hexanediol, trimethylene glycol, tetramethylene glycol, and pentamethylene glycol. Small amounts of linear condensation polymers are also produced when there are five atoms between the hydroxyl groups, as in the case of diethylene glycol.

These cyclic oils are water-insoluble materials which are stable even at high temperatures, up to 250° C. or more. They serve as valuable synthetic lubricants and transmission media for hydraulic mechanisms.

E. An important and distinctive group of new compounds are the linear condensation products obtained by the reaction of a difunctional compound having only two reactive-hydrogen-containing groups with a compound of Formula I*a* or, when there are at least eight atoms (which may be C, S, O, or N atoms) between the reactive hydrogen atoms of the first compound, with a compound of Formula I in which x is 2.

(1) When the reaction is effected with a simple difunctional compound, it may be illustrated by reference to the reaction with a glycol which is as follows:

R'R"N(Si(R)$_2$O)$_y$Si(R)$_2$NR'R" + HOR$^a$OH →
 $+(Si(R)_2O)_y—Si(R)_2OR^aO\}_z$ (R°)$_2$Si(NR'R")$_2$ + HOR$^b$OH → $\{Si(R°)_2OR^bO\}_z$ where z is an integral or mixed number having a value or an average value greater than 2, R$^a$ is any alkylene radical, and R$^b$ is an alkylene, alkoxyalkyl, or poly(alkoxy)alkyl group of 5 to 20 carbon atoms having at least 5 and preferably at least 6 atoms in a chain between the hydroxyl groups.

(2) When the compound containing two reactive hydrogen groups is a linear condensation polymer having the reactive groups as terminal or end groups, such as polyethers or polyesters having terminal hydroxyl groups, the same equations may serve to represent the reactions with the understanding that R$^a$ or R$^b$ is replaced by the polyether or polyester residue between the terminal hydroxyl groups.

The linear condensation polymers that may thus be reacted with compounds of Formulas I or I*a* include the polymeric condensates obtained by reacting combinations or mixtures of materials of the general types following:

1. Glycols (or other diols) and dibasic acids
2. Amino alcohols and dibasic acids
3. Glycols, diamines and dibasic acids
4. Glycols, amino alcohols and dibasic acids
5. Amino alcohols, diamines and dibasic acids
6. Amino acids, glycols and dibasic acids
7. Amino acids, amino alcohols and dibasic acids
8. Amino alcohols, glycols and dibasic acids
9. Amino alcohols, glycols and dibasic acids
10. Amino alcohols, dibasic acids and hydroxycarboxylic acids It is advantageous to use a small excess of the alcoholic-hydroxyl-containing or of the amino-containing constituent in preparing the polymers.

Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic isophthalic hexahydroterephthalic, p-phenylene-diacetic and acetone-dicarboxylic acid.

Any amino alcohol having at least one hydrogen atom attached to the amino nitrogen atom may be employed including aromatic amino alcohols, e. g. p-hydroxymethylbenzylamine, 4-hydroxymethyl-4-aminomethyldiphenyl and p-aminophenylethyl alcohols; aliphatic amino alcohols, e. g. 5-aminopentanol-1:6-amino-5-methylhexanol-1,4(p-aminophenyl)cyclohexanol, hydroxyethoxyethoxyethylamine, and N-(β-aminoethyl)-N-(omega-hydroxyhexyl)-aniline.

The preferred amino alcohols are of formula

HO—R—NH$_2$ where R represents saturated divalent hydrocarbon radicals with a chain length of at least two carbon atoms. Amino alcohols which fall within this group include ethanolamimne, 3-aminopropanol, 4-aminobutanol, 6-aminohexanol, and 10-aminodecanol.

Any diamine may be employed, which contains at least one hydrogen atom attached to each amino nitrogen atom. The preferred diamines are of formula NH$_2$RNH$_2$ where R represents saturated divalent hydrocarbon radicals with a chain length of at least two carbon atoms, e. g. ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula

HO—R—COOH where R represents saturated divalent hydrocarbon radicals, e. g. 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

The polymeric silicon-contining substances obtained by the reactions described in parts (1) and (2) of part E above are all undistillable polymers, of high heat stability, and having a wide variation in viscosity depending on the relative sizes of the silicon-containing and organic portions, as well as on the time of heating. In their formation, after the by-product amine has been removed, a gel often forms. The mixture is then put under vacuum and heated strongly until the gel goes over to a copolymeric liquid. In the case of reacting I*a* with the linear condensation polymers of E part (2), the final condensation polymer is a block copolymer in the sense that both reactants are different polymers.

The advantage of these copolymers over, on the one hand, the silicones, and, on the other, organic liquid polymers lies in the fact that the advantages of both are combined to some extent. The copolymers are more compatible in organic systems than the silicones and more hydrophobic and heat-stable than the organic polymers. A unique feature is the ability to obtain any desired viscosity by changing the reactants. The products have a wide variety of uses in textile applications, as synthetic lubricants, as lube oil additives, in foam-reducing applications and in leather applications.

Illustrative preparation of compounds of Formula I

EXAMPLE A

A solution is made of 365 parts of t-butylamine in 600 parts of benzene. There is added dropwise to this solution, at 0 to 5° C., a solution of 217 parts of trimethylchlorosilane in 600 parts of dry benzene. After addition is completed, the reaction mixture is filtered and the solid residue washed with dry benzene. The benzene solutions are distilled and the product, trimethyl-t-butylaminosilane, boiling at 118° to 119° C., $n_D^{25}$ 1.4060 is used in the subsequent reactions. It analyzes 9.7% nitrogen (9.6% theoretical).

In similar fashion, when dry diethylamine is substituted for the t-butylamine, there is obtained trimethyl-(diethylamino)silane in the fraction boiling in the range 125° to 127° C., $n_D^{25}$ 1.4105, and containing by analysis 9.7% N (theory 9.6%).

To a solution of 39 parts of benzylamine and 60 parts of triethylamine in 300 parts of benzene is added at 0 to 5° C. 40 parts of trimethylchlorosilane. Benzylaminotrimethylsilane, isolated as in the preceding examples in a fraction boiling at 95° to 96° C. at 15 mm. of mercury, $n_D^{25}$ 1.4918 (percent N, 7.9 found, 7.8 calculated).

By similar methods, there are prepared 1,1,3,3-tetramethylbutylaminotrimethylsilane, obtained in a fraction having a boiling range of 190° to 195° C., and trimethylsilylaniline, in a fraction having a boiling range of 92° to 93° C. at 12 mm. of mercury.

Illustrative preparation of compounds of Formula Ia

EXAMPLE B

A solution is made of 292 parts of t-butylamine in 550 parts of dry benzene. To this solution at 0 to 5° C. is added dropwise a solution of 234 parts of a dichloropolysiloxane of Formula Ib (R=CH₃, y=2.3) at such a rate as to maintain the temperature between 0 and 5° C. The t-butylammonium chloride is removed by filtration and excess amine and solvent are removed by heating on a steam-bath at 20 mm. of mercury. There results 278 grams of $(t-C_4H_9)NH(-Si(CH_3)_2O)_{2.3}Si(CH_3)_2NH(t-C_4H_9)$ a fluid oil with a neutral equivalent of 196 by titration with HCl (theory 192).

Bis-aminopolysiloxanes are prepared from piperidine, pyrrolidine, dodecylamine and di-n-butylamine by reaction with this dichloropolysiloxane in the same fashion. All of these aminopolysiloxanes are useful in the succeeding examples.

The following examples are illustrative of the invention, parts given being by weight unless otherwise noted:

EXAMPLE 1

(a) A mixture is made of 206 parts of methylaminotrimethylsilane and 148 parts of n-butanol. The mixture is carefully heated in a flask connected with an 8-inch Vigreux column to about 60° C. Methylamine is evolved. After amine evolution is complete, the temperature is raised and the mixture carefully distilled. The portion boiling at 122° to 125° C corresponds to trimethylbutoxysilane.

(b) In similar fashion, this aminosilane is reacted with n-dodecyl alcohol, n-octadecyl alcohol, and methoxy ethanol. In these cases, however, a higher temperature of reaction can be reached, if desired, by using a silane derived from higher boiling amines, such as trimethyl-t-butylaminosilane, pyrrolidinotrimethylsilane, trimethyl(diethylamino)silane, all of them giving the same product, for example dodecoxytrimethylsilane by reaction with n-dodecyl alcohol, at temperatures ranging from 75° to 125° C.

EXAMPLE 2

A mixture is made of 28 parts of 1,3-bis-t-butylamino-1,1,3,3-tetramethyldisiloxane with 38 parts of n-dodecyl alcohol. The mixture is heated to 80° C. at which temperature t-butylamine is slowly evolved. After 14 parts of t-butylamine are obtained, the reaction is completed and the 1,3-bis-dodecoxy-1,1,3,3-tetramethyldisiloxane results as a fluid high-boiling oil which is useful as a stable heating (or heat-transfer) medium.

EXAMPLE 3

A mixture is made of 39 parts of bis-diethylaminopolysiloxane of structure Ia, in which R is methyl and y is 2.3, with 40 parts of t-dodecyl mercaptan. The mixture is heated to 80° C. and diethylamine is removed by distillation. The resulting oil is the bis-dodecyl mercaptopolysiloxane. It is useful in admixture with oils and synthetic lubricants, in amounts of 1 to 10% by weight of the oil, to improve the temperature-viscosity properties thereof.

EXAMPLE 4

A mixture is made of 23 parts of diethyl-bis-t-butylaminosilane and 19 parts of commercial phenol which has been carefully dried by refluxing with benzene and azeotropically removing the water. This mixture is heated to 90° C., and after evolution of t-butylamine is complete, the product is distilled. The fraction boiling at about 140° C. at 3 mm. of mercury corresponds to diethyldiphenoxysilane. In similar fashion, thiophenol gives diethyldiphenylthiosilane.

EXAMPLE 5

A mixture of 39 parts of the diethylaminopolysiloxane of Example 3 and 19 parts of phenol is heated to 90° C. ultimately to 130° C. until no more diethylamine is evolved. The resulting oil is a polysiloxane of the structure

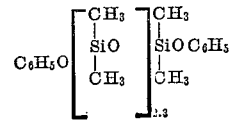

It is useful as a hydraulic transmission medium for lifts, brakes, etc.

EXAMPLE 6

To a stirred mixture of 5.9 parts of acetamide, 12.1 parts of triethylamine, and 88 parts of benzene is added dropwise a mixture of 29.5 parts of triphenylchlorosilane and 88 parts of benzene. The mixture is then refluxed for two hours and filtered while hot. Alternate partial stripping and filtration removes all the triethylamine hydrochloride to leave 15 parts (47% yield) of product, N-triphenylsilylacetamide, M. P. 159° to 163° C.

*Analysis.*—Found: N, 4.2%; theory: N, 4.4%.

EXAMPLE 7

(a) A mixture of 22 parts of t-butylaminotrimethylsilane and 14.5 parts of benzamide is heated until, at 120° C., 9 parts of t-butylamine is removed. The solid residue is distilled, the fraction boiling in the range 142° to 143° C./0.54 mm. Hg giving 22 parts (a 96% yield) of product, N-trimethylsilylbenzamide, M. P. 118° to 120° C.

*Analysis.*—Found: C, 62.2%; H, 8.0%; N, 7.2%. Theory: C, 62.2%, H, 7.8%, N, 7.3%.

(b) When benzamide is reacted with trimethylchlorosilane in benzene and in the presence of triethylamine, by a procedure similar to that described in Example 6, there is obtained only a 52% yield of the same product as in part (a) hereof.

EXAMPLE 8

To a stirred mixture of 23.4 parts of N-methylacetamide, 70 parts of triethylamine and 196 parts of dry benzene, is added 35 parts of trimethylchlorosilane in 79 parts of dry benzene, at 0° to 5° C. The reaction mixture is then filtered and the filtrate is distilled to yield 35 parts (76% yield) of product, N-methyl-N-trimethylsilylacetamide, in the fraction having a boiling range of 48–9° C./11 mm. Hg, $n_D^{24}$ 1.4379. Anal.

Found: C, 49.7%; H, 10.4%; N, 9.7%. Theory: C, 49.6%; H, 10.3%; N, 9.7%.

EXAMPLE 9

(a) A mixture of 18 parts of formamide and 80 parts of dry benzene is distilled until 5 parts of the benzene is removed, the boiling point then being 80° C. The mixture is then cooled and 58 parts of t-butylaminotrimethylsilane is added. The reaction mixture is then heated under a Vigreux column and distilling head. A total of 63 parts of distillate is removed, boiling range 65° to 75° C., after which time the temperature of the distillate rises to 80° C.

An aliquot portion of the distillate is titrated with 0.1 N HCl giving a total amine value of 28.8 parts (theoretical t-butylamine: 29.2 parts). The residue is then distilled under vacuum to yield 40 parts of N-trimethylsilylformamide in the fraction boiling in the range 84°–85° C./21 mm. Hg. Anal. Calculated: N, 12.1%; found, 12.4%.

(b) A mixture of 19 parts of t-butylaminotrimethylsilane and 7 parts of acetamide is heated at 75° C. for 1½ hours during which 7 parts of t-butylamine is distilled. The residue is distilled to yield 15 parts (a 96% yield) of product, N-trimethylsilylacetamide, B. P. 185–186° C., M. P. 52° to 54° C. Anal. Found: C, 45.6%; H, 9.9%; N, 10.6%. Theory: C, 45.8%; H, 9.9%; N, 10.7%. It exhibits hypnotic and anticonvulsant properties.

EXAMPLE 10

A solution is made of 284 parts of methacrylamide and 1010 parts of triethylamine in 3000 parts of dry benzene. This is cooled to 5° C., and a solution of 435 parts of trimethylchlorosilane in 750 parts of benzene is added gradually with stirring at such a rate as to approximately maintain this temperature. After addition is complete, the mixture is filtered and the benzene is removed by heating on a steam bath in vacuo. There results 480 parts of trimethylsilylmethacrylamide as a crude solid. This is further purified by heating to 70° C. at 0.8 mm. Hg. The solid then sublimes and is isolated on an appropriately chilled surface. The sublimed solid melts at 65° to 68° C. When dissolved in toluene, this solid is polymerized by heating at 75° C. for 24 hours in the presence of about 1% azoisobutyronitrile catalyst. Films may be cast from this solution. The solution of the polymer may also be applied to leather, fabric, etc. with or without further heating to modify water-absorption and shrinkage properties thereof. A similarly useful product can be prepared using acrylamide instead of methacrylamide in equivalent amount.

EXAMPLE 11

A mixture is made of 311 parts of N-n-octadecyl acetamide and 100 parts of pyridine in 500 parts of dry benzene. This is cooled to 5° C. A solution of 287 parts of a dichlorodimethylpolysiloxane of Formula Ib in 500 parts of benzene is made. This polysiloxane contains an average of approximately 7.0 silicon atoms in the chain. This solution is added dropwise at about 10° C. to the solution of the amide, over a period of several hours. The pyridine hydrochloride is removed by filtration and the benzene layer is stripped in vacuo under anhydrous conditions. The resulting thick, yellow oil is essentially $$CH_3CON(C_{18}H_{37})(Si(CH_3)_2O)_6Si(CH_3)_2$$
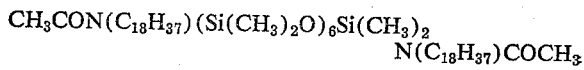
$$N(C_{18}H_{37})COCH_3$$

contaminated with a slight amount of chlorine. It is useful in the waterproofing of cellulosic fabrics. For this purpose, a 5% solution in toluene is sprayed on the fabric and the fabric dried. Similar oils are prepared from polysiloxanes containing from about three to seven silicon atoms (y is 2 to 6) by reaction with N-n-dodecylpelargonamide, N-ethylstearamide, N-n-propyloleamide, and like substituted amides.

EXAMPLE 12

(a) In a flask there is placed 528 parts of dry benzene and 275 parts (3.75 moles) of dry n-butylamine. To this solution is added at 5 to 10° C. a solution of 80.8 parts (0.5 mole) of vinyltrichlorosilane in 132 parts of dry benzene over a period of 40 minutes. Some solid precipitates. The reaction mixture is heated at reflux (80° C.) for one hour and is then allowed to stand at room temperature for 65 hours. Then there is filtered off 147 parts of n-butylamine hydrochloride which corresponds to 89.6% of theory. The benzene filtrate when stripped to 300 cc. gives an additional 15.7 parts of n-butylamine hydrochloride (9.5% of theory). Distillation of the benzene filtrate yields 55.3 parts of a cloudy yellow oil, tri-(n-butylamino)vinylsilane, in the fraction boiling in the range 110° to 112° C./0.9 mm. Hg and having a neutral equivalent of 91.9 (theory=90.5).

(b) In a flask there is placed 27.6 parts (0.1 mole) of tri-n-butylaminovinylsilane and 17.7 parts (0.3 mole) of acetamide. The flask is attached to a still head. The reaction mixture is heated at 120° to 160° C. for two hours during which time 20.9 parts (theory=21.9) of n-butylamine is obtained. The reaction mixture solidifies upon cooling to room temperature. The solid is washed with ether to remove unreacted tri-n-butylaminovinylsilane. The product, triacetamido-vinylsilane, is a white ether-insoluble solid which partially melts on heating.

EXAMPLE 13

To a stirred mixture of 34 parts of pyrrolidone, 48.5 parts of triethylamine and 66 parts of dry benzene is added a mixture of 43.5 parts of trimethylchlorosilane and 40 parts of benzene, at 0–2° C. The reaction mixture is then filtered and the filtrate is distilled to yield 56.5 parts (79.5% yield) of product, N-trimethylsilylpyrrolidone, in the fraction boiling in the range 77° to 81° C./6 mm. Hg. Anal. Found: C, 53.5%, H, 9.8%, N, 9.0%. Theory, C, 53.5%, H, 9.6%, N, 8.9%. It exhibits hypnotic and anticonvulsant properties.

At a concentration of 1 part in 800 parts of a high-boiling aromatic naphtha, the application of this product effects a 72% kill of red spider mites.

EXAMPLE 14

In a flask equipped with a thermometer well, there is placed 22.6 grams (0.2 mole) of epsilon-caprolactum and 37.8 grams (0.0856 mole, 171.2 ml. eq.) of di-t-butylaminodimethylpolysiloxane (y is 2.3). The reaction mixture is heated under a still head at 106° to 154° C. for 10.5 hours. The t-butylamine is removed by distillation as it is formed. A total of 9.7 grams of distillate (theoretical 12.5 grams) or 77.6% of theory is obtained. A titration of the dark brown oily still residue shows 36 ml. eq. of base to be present. This indicates that 79% of the reaction is completed. The oily still residue contains some solid. Addition of cold dry ligroin precipitates 6.2 grams of unreacted caprolactam (theory=7.3 grams). Addition of an activated carbon to the ligroin solution and then heating for a short period gives a slight improvement in color. The filtrate, after carbon removal, is stripped at 95° C./20 mm. Hg to yield 40.3 grams of a dark brown oil. Theory=45.5 grams. The final concentrate contains 26 ml. eq. of base which is equivalent to a 14.6% content of the starting aminopolysiloxane. On this basis, the calculated nitrogen content is 5.4%. Nitrogen found=5.4%. It is useful as a hydraulic transmission medium for lifts, brakes, etc.

EXAMPLE 15

A mixture of 34 parts of t-butylaminotrimethylsilane and 6.6 parts of urea is heated at 110° C. for 12 hours during which 7 parts of t-butylamine is removed. The excess silane is distilled and the solid residue is sublimed to yield 30 parts (89% yield) of product, N-trimethylsilylurea, M. P. 168° to 171° C. Anal. Found: C, 36.6%, H, 9.2%, N, 20.9%. Theory: C, 36.4%, H, 9.1%, N, 21.2%.

EXAMPLE 16

To 8.6 grams (0.1 mole) of crystallized ethylene-urea there is added 70 cc. of benzene and this slurry is refluxed for two hours using a water separator. The slurry is cooled to room temperature and 29 grams (0.216 mole) of t-butylaminotrimethylsilane is added. After two hours of heating the solution at 75° C., evolution of t-butylamine is complete. The benzene is stripped under reduced pressure leaving 20 grams of crude solid. This solid is fractionally crystallized from anhydrous ether to yield 16.5 grams of a solid product (a), N,N′-bis(trimethylsilyl)-N,N′-ethyleneurea having a melting point of 67° to 68.5° C. and a nitrogen content of 12.4% as compared with 12.2%; theoretical value. Another fraction (1.5 grams) is essentially a solid product (b), N-trimethylsilyl-N,N′-ethyleneurea, having a M. P. 118° to 120° C. and an analysis of C, 45.7%; H, 8.9%, N, 17.9%. The calculated values are: C, 45.6%, H, 8.9%, N, 17.7%.

Both solids are soluble but to different extents in benzene and ether.

A 10% solution of solid (a) in toluene is sprayed on paper as it proceeds over, and approaches the end of, the series of drying drums of a paper-making machine. The finished paper has reduced moisture absorption and increased wet strength.

EXAMPLE 17

A 13.2 gram (0.15 mole) batch of N,N′-dimethylurea is refluxed as a slurry with 90 cc. of benzene for two hours using a water separator. After cooling the benzene slurry to room temperature, there is added 45 grams (0.31 mole) of t-butylaminotrimethylsilane. After five hours of heating at 74° to 85° C., 10.5 gram of t-butylamine is distilled and substantially no more amine is evolved thereafter. The benzene is stripped and 25.0 grams (85% yield) of crude N-trimethylsilyl-N,N′-dimethylurea is obtained as a solid. The solid is purified by sublimation at 1 mm. Hg pressure and 70° C. to give a product having a M. P. of 77° to 79° C.

The product above is soluble in both benzene and ether.

A cotton fabric is passed through a 10% solution of the product in toluene. On drying and heating to 150° C. for ten minutes, the fabric obtained is characterized by a pleasing hand and improved resistance to moisture, staining, and wrinkling.

EXAMPLE 18

(a) A mixture is made of 365 parts of urethane (ethyl carbamate) in 1500 parts of dry benzene. This solution is refluxed for two hours using a water separator to remove any water introduced with the urethane. To the cooled benzene solution is added 710 parts of triethylamine, and the mixture is cooled to 5° C. There is then added at such a rate as to maintain a temperature of less than 20° C., a solution of 440 parts of trimethylchlorosilane in 400 parts of dry benzene. At the completion of the addition, the reaction mixture is heated to 80° C., and filtered to remove triethylamine hydrochloride, the precipitate being washed with hot dry benzene. The combined filtrate and extracts are then distilled to yield 340 parts of ethyl N-trimethylsilylcarbamate, a colorless liquid, in the fraction boiling in the range 170° to 175° C., $n_D^{25}$ 1.4184.

(b) The same compound as that produced in part (a) is obtained by the following procedure: The mixture of 21 parts of urethane in 100 parts of benzene is azeotroped with benzene to remove any water in the urethane. The benzene is then removed by stripping, and to the dried solid is added 44 parts of N-(trimethylsilyl)-t-butylamine. After about twelve hours of heating at 100° C., the mixture is cooled, anhydrous ether is added and any solid formed is removed by filtration. The filtrate is distilled to give a liquid boiling at 172° to 175° C., $n_D^{25}$ 1.4184, which is identical with the product obtained from the chlorosilane.

A wool fabric is passed through a 10% solution of the product in toluene. After drying, it is heated to 80° C. for one-half hour. The fabric is characterized by improved resistances to moisture and staining, and by reduced shrinkage on washing.

EXAMPLE 19

A mixture of 44 parts of 2,5-dimethyl-1,6-hexanediol and 61 parts of bis(t-butylamino)dimethylsilane is heated until 42 parts of t-butylamine is distilled (theory: 44 parts). The liquid residue is then heated under vacuum to remove unreacted starting material and to complete polymerization. The final condensation polymer of bis-(t-butylamino)dimethylsilane and 2,5-dimethyl-1,6-hexanediol is oily, heat stable, and has a molecular weight of 2360. Yield: 54 parts (89%).

EXAMPLE 20

By substituting 255 parts of 2,5-hexanediol in Example 19, there is obtained 320 parts of the cyclic siloxane

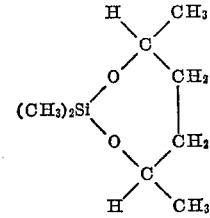

Analysis: Found, percent C, 55.4, Theory, 55.1. Found, percent H, 10.5, Theory, 10.3.

EXAMPLE 21

A mixture of 56 parts of dimethyl-bis-(t-butylamino)-silane and 30 parts of paraphenylenediamine is slowly heated until close to the theoretical amount of t-butylamine is liberated. The reaction mixture is heated vigorously with a direct flame at a pressure of 12 mm. of mercury until nothing else distills. A solid brown condensation polymer is formed.

This procedure is repeated substituting 40 parts of adipamide for the paraphenylenediamine. A solid condensation polymer is again obtained.

EXAMPLE 22

A solution is made of 200 parts t-butylamine and 303 parts triethylamine in 900 parts of dry benzene. It is cooled to 0 to 5° C., at which temperature there is added 260 parts of dimethyldichlorosilane, dropwise. The precipitate is removed by filtration and the filtrate is distilled to yield 335 parts of bis-t-butylaminodimethylsilane, boiling mostly at 185° to 186° C.

A mixture is made of 15 parts of dipropylene glycol (bis-β-hydroxypropyl ether) and 20 parts of bis-t-butyl-aminodimethylsilane. It is heated to drive off t-butylamine (80° to 125° C.). Reaction ceases in about one hour, and 12 parts of t-butylamine are collected. The remainder is heated at 12 mm. of mercury, at which pressure a product having the characteristics of a cyclic siloxane distills, at 145° C. rising slowly to 210°.

In similar fashion, when propylene glycol is used as the diol, a mixture of cyclic siloxanes distills at about 125° C. at 15 mm. of mercury pressure.

EXAMPLE 23

A mixture is made of 430 parts of dimethyl-bis-t-butyl-aminosilane and 236 parts of pinacol. This mixture is heated to remove t-butylamine, of which about 50% is obtained after heating for 10 hours. Distillation of the residue gives 230 parts of a liquid cyclic siloxane, in the fraction boiling in the range 157° to 159° C., $n_D^{25}$ 1.4207.

EXAMPLE 24

(a) In a reaction vessel, there is reacted in solution in dry benzene a mixture of four molecular equivalents of morpholine with one equivalent of a dichloropolydimethylsiloxane of the structure:

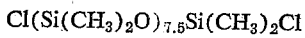

in dry benzene solution. The morpholine hydrochloride produced is removed by filtration and the benzene layer is stripped to produce the bis-morpholinopolydimethylsiloxane of the structure:

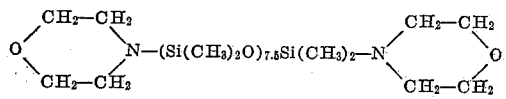

(b) A mixture is made of 39 parts of this polysiloxane (product of part (a)) with 20 parts of n-hexyl 9,10-dihydroxystearate. This mixture is heated to 130° C. and evacuated to a pressure of 200 mm. of mercury. Morpholine slowly distils out, and when distillation is complete, there is collected about the theoretical amount of the amine. The residue is then heated to 360° C. at a pressure of 15 mm. of mercury to remove all low-boiling components. A linear polymeric product remains behind as a free-flowing yellow oil. This oil may be used in admixture with motor oils and with synthetic lubricants, such as di-n-octyl sebacate, to lend properties of low-temperature flow and stability to high temperatures. For this purpose, 2% to 10%, on the weight of the lubricant, of the condensation polymer is generally adequate, though more may be used, if desired.

EXAMPLE 25

Three hundred and ninety parts of bis-t-butylaminopolydimethylsiloxane (y is 2.2) is mixed with 80 parts of proprylene glycol and the mixture is heated at 130° C. until approximately 120 parts of t-butylamine is recovered. The residual liquid is heated at a pressure of 15 mm. of mercury. It first becomes spongy, and then clear. On cooling, a viscous, opaque linear polymer is obtained. Addition of 2% to 10% of this polymer with organic ester lubricants, such as di-n-octyl sebacate, lowers the pour point thereof and increases its heat stability.

EXAMPLE 26

One hundred ninety-five parts of the bis-t-butylaminopolydimethylsiloxane of Example 25 is mixed with 215 parts of a polypropylene glycol containing an average of about 7.5 oxypropylene units. The mixture is heated to about 120° C., at which temperature t-butylamine is evolved. After about three hours of heating, 55 parts of t-butylamine are obtained. The residual liquid is then heated at a pressure of 25–30 mm. of mercury, first at 125° C. and slowly increasing to 320° C. after two hours and for an additional 45 minutes at 320° C. The dark polymers so obtained can be clarified by charcoaling. The light oil so obtained has a viscosity at 25° C. of 130 centipoises. On continued heating at 320° C., the viscosity of the polymer is increased, for example, after three hours, an oil with a viscosity of 205 centipoises is obtained. This polymer is useful as a hydraulic transmission medium in a hydraulic brake or lift system.

EXAMPLE 27

A bis(diethylamino)polydiethylsiloxane is prepared by reacting 286 parts of a compound of the formula

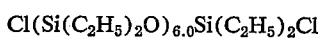

with four molecular equivalents (98 parts) of diethylamine dissolved in 500 parts of dry benzene. The diethylamine hydrochloride which forms is removed by filtration and well washed with dry benzene. To the filtrate is then added seventy-five parts of triethylene glycol. The mixture is carefully heated under an 8-inch Vigreux column at about 150° C. until approximately theoretical amounts of diethylamine are obtained. The temperature is then raised to remove the benzene by distillation, and finally the residue is heated vigorously at a pressure of 13 mm. of mercury. There is obtained a heat-stable polymeric light yellow oil which is characterized by excellent viscosity-temperature relationship, and may be used as a synthetic lubricant and hydraulic fluid.

EXAMPLE 28

A mixture of 62 parts of bis(t-butylamino)polydimethylsiloxane (y having an average of 2.2 in Formula Ia) and 24 parts of 2,5-dimethyl-1,6-hexanediol is heated until 21 parts of t-butylamine is distilled (about 3 hours). The residue, at first a spongy gel, is then heated vigorously under pressure until 40 parts (65% yield) of an oily polymer of a molecular weight of 1920 is obtained. It is a good synthetic lubricant and also useful as a hydraulic transmission medium. It is resistant to oxidation.

EXAMPLE 29

A mixture of 10 parts of bis(t-butylamino)dimethylsilane and 94 parts of a hydroxy-terminated condensation product of adipic acid with a mixture (50:50 mole ratio) of ethylene and propylene glycols, is heated under vacuum. The final product is a waxy polymer. When rubbed on leather, a water-repellent surface is obtained.

EXAMPLE 30

A mixture of 17 parts of bis(t-butylamino)polydimethylsiloxane of Formula Ia (in which y has an average value of 2.5 in a mixture containing such polysiloxane molecules in which y has integral values all the way from 1 through 9) and 51 parts of a hydroxy-terminated condensation product of adipic acid with a mixture (50:50 mole ratio) of ethylene and propylene glycols is heated until 3 parts of t-butylamine is distilled. The residue is heated under vacuum. The final product is a waxy polymer. It hydrophobizes leather, textile fabrics, and industrial papers and felts.

EXAMPLE 31

A mixture of 38.5 parts of bis(t-butylamino)polydimethylsiloxane (of Example 30) and 15 parts of dipropylene glycol is heated until 13 parts of t-butylamine is collected. The residue is heated vigorously under 13 mm. Hg pressure. At first a spongy material forms but this becomes liquid after continued heating. The polymeric product is a stable oil. It serves as a synthetic lubricant and a transmission medium in hydraulic lifts, brakes, etc.

EXAMPLE 32

Pure alpha cellulose is refluxed with a large excess of t-butylaminotrimethylsilane for eight hours. A small amount of t-butylamine is distilled. The reaction mixture is then filtered and the cellulose air-dried. This treated cellulose is not wet by water.

EXAMPLE 33

Nylon 66 cloth is refluxed for 30 hours with a large excess of t-butylaminotrimethylsilane. A small amount of t-butylamine is evolved. The nylon thus treated is completely impervious to droplets of water on its surface, while untreated nylon gradually absorbs similar droplets of water. This increased hydrophobicity is present even after two washings with warm water.

It is to be understood that changes and variations may be made without departing from the spirit and scope of the invention as defined in the appended claims.

We claim:

1. A method for producing silicon-containing organic compounds which comprises reacting, at a temperature from 10° C. to 180° C., (1) an organic compound the atoms of which consist of carbon, hydrogen, and at least one atom attached directly to a carbon atom selected from the group consisting of oxygen, sulfur, and nitrogen, said compound containing at least one reactive hydrogen atom attached directly to an atom selected from the group consisting of oxygen, sulfur, and nitrogen atoms, and (2) a silicon-containing compound having the formula

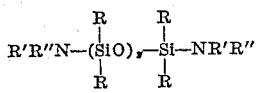

where R is a lower alkyl group having 1 to 3 carbon atoms, R' and R" are selected from the group consisting of radicals directly attached only to the adjoining N atom and radicals which together and with the adjoining N atom form a heterocyclic nucleus from the group consisting of morpholino, piperidino, and pyrrolidino, R', when directly attached only to the adjoining N atom, is selected from the group consisting of cyclohexyl, phenyl, aralkyl, and alkyl groups having 1 to 18 carbon atoms, R", when directly attached only to the adjoining N atom, is selected from the group consisting of hydrogen, cyclohexyl, aralkyl, and alkyl groups having 1 to 18 carbon atoms, the total of carbon atoms in R' and R" together being no greater than 18, with the proviso that when R' is an alkyl group containing a tertiary carbon atom attached to the nitrogen atom, R" is H, and $y$ is a number having a value of about 1 to 9.

2. A method as defined in claim 1 in which the first-mentioned compound is an alcohol.

3. A method as defined in claim 1 in which the first-mentioned compound contains a plurality of alcoholic hydroxyl groups.

4. A condensation reaction product of (1) an organic compound the atoms of which consist of carbon, hydrogen, and at least one atom attached directly to a carbon atom selected from the group consisitng of oxygen, sulfur, and nitrogen, said compound containing at least two reactive hydrogen atoms, each reactive hydrogen atom being attached directly to an atom selected from the group consisting of oxygen, sulfur, and nitrogen atoms, and (2) a silicon-containing compound having the formula $$R'R''N—(Si(R)_2O)_y—Si(R)_2—NR'R''$$

where R is a lower alkyl group having 1 to 3 carbon atoms, R' and R" are selected from the group consisting of radicals directly attached only to the adjoining N atom and radicals which together and with the adjoining N atom form a heterocyclic nucleus from the group consisting of morpholino, piperidino, and pyrrolidino, R', when directly attached only to the adjoining N atom, is selected from the group consisting of cyclohexyl, phenyl, aralkyl, and alkyl groups having 1 to 18 carbon atoms, R", when directly attached only to the adjoining N atom, is selected from the group consisting of hydrogen, cyclohexyl, aralkyl, and alkyl groups having 1 to 18 carbon atoms, the total of carbon atoms in R' and R" together being no greater than 18, with the proviso that when R' is an alkyl group containing a tertiary carbon atom attached to the nitrogen atom, R" is H, and $y$ is a number having a value of about 1 to 9.

5. A linear polymeric product of condensation of a bis-morpholinopolydimethylsiloxane with n-hexyl 9,10-dihydroxystearate.

6. A condensation product of bis-t-butylaminopolydimethylsiloxane with polypropylene glycol.

7. A linear polymeric product of condensation of a bis(diethylamino)polyqdiethylsiloxane with triethylene glycol.

8. A linear polymeric product of condensation of a bis(t-butylamino)polydimethylsiloxane with 2,5-dimethyl-1,6-hexanediol.

9. A linear polymeric product of condensation of a bis(t-butylamino)polydimethylsiloxane with an alcoholic hydroxy-terminated condensation product of adipic acid with a mixture of ethylene and proylene glycols.

10. A condensation reaction product as defined in claim 4 in which the first-mentioned organic compound contains more than two of said reactive hydrogen atoms.

11. A condensation reaction product as defined in claim 4 in which the first-mentioned organic compound contains only two of said reactive hydrogen atoms.

12. A condensation reaction product as defined in claim 4 in which the first-mentioned organic compound is an alcoholic hydroxy-terminated linear condensaion product of a dihydric alcohol with a dicarboxylic acid.

13. A condensation reaction product as defined in claim 4 in which the first-mentioned organic compound is n-hexyl 9,10-dihydroxystearate.

14. A condensation reaction product as defined in claim 4 in which the first-mentioned organic compound is polypropylene glycol.

15. A condensation reaction product as defined in claim 4 in which the first-mentioned organic compound is triethylene glycol.

16. A condensation reaction product as defined in claim 4 in which the first-mentioned organic compound is 2,5-dimethyl-1,6-hexanediol.

17. A condensation reaction product as defined in claim 4 in which the first-mentioned organic compound is a hydroxy-terminated condensation product of adipic acid with a glycol selected from the group consisting of ethylene and propylene glycols and a mixture thereof.

References Cited in the file of this patent

UNITED STATES PATENTS

| | | |
|---|---|---|
| 2,429,883 | Johannson | Oct. 28, 1947 |
| 2,553,314 | Haber | May 15, 1951 |
| 2,579,417 | Cheronis | Dec. 18, 1951 |
| 2,626,270 | Sommer | Jan. 20, 1953 |

OTHER REFERENCES

Miner et al.: Ind. and Eng. Chem., vol. 34, No. 11, November 1947, pages 1368–1371.

Larsson et al.: Chem. Abstracts, vol. 44, 1950, col. 1402.

Gilman; Chem. Reviews, vol. 52, No. 1, February 1953, pages 77, 105 and 106.